United States Patent [19]

Mott et al.

[11] Patent Number: 5,183,683
[45] Date of Patent: Feb. 2, 1993

[54] PROCESS FOR PRODUCING A FUNCTIONAL PROTEIN PRODUCT FROM VEGETABLE PROTEIN MATERIALS

[75] Inventors: Stephen D. Mott, Market Harborough, Great Britain; Richard F. Johnson, Kettering, England

[73] Assignee: Protein Technologies International, Inc., St. Louis, Mo.

[21] Appl. No.: 381,226

[22] Filed: Jul. 18, 1989

[30] Foreign Application Priority Data

Jul. 18, 1988 [GB] United Kingdom ............... 8817061

[51] Int. Cl.⁵ ........................................... A23L 1/31
[52] U.S. Cl. ................................. 426/641; 426/656; 426/802
[58] Field of Search ............... 426/302, 641, 656, 646, 426/802, 805

[56] References Cited

U.S. PATENT DOCUMENTS 2,583,964  1/1952  Otter ................................. 426/302
3,719,499  3/1973  Hai et al. .......................... 426/641
3,914,457  10/1975  Nagel ................................ 426/641
4,190,679  2/1980  Coffee et al. ..................... 426/641

FOREIGN PATENT DOCUMENTS 60-30645  2/1985  Japan .
62-74264  4/1987  Japan .

Primary Examiner—Joseph Golian
Assistant Examiner—Leslie Wong
Attorney, Agent, or Firm—Virgil B. Hill

[57] ABSTRACT

A process for producing a vegetable protein product for use with an animal protein material in which a non-hydrated vegetable proteinaceous extract is blended under conditions of shear with a quantity of water insufficient for full hydration of the extract and a frozen animal food product having a temperature sufficiently low to render it essentially rigid, e.g. not greater than 0° C., to produce a granular product containing said vegetable proteinaceous extract and said animal food product.

8 Claims, 5 Drawing Sheets

PROCESS FOR PRODUCING A FUNCTIONAL PROTEIN PRODUCT FROM VEGETABLE PROTEIN MATERIALS

BACKGROUND OF THE INVENTION

The present invention relates to a novel protein composite material which is formed from a vegetable proteinaceous extract and which can be used with protein materials and products derived from animal sources. The product of the invention is designed to simulate a granulated (e.g. minced) protein product, notably, but not exclusively, a granular meat product and may be used to supplement the meat content of meat products, such as pie fillings and sausages.

The use of vegetable protein materials in and with meat products has a long (and mostly honourable) history but increasing interest has been shown in this question in the last couple of decades as the price of natural meat products has tended to rise at a rate faster than that of average incomes, thus resulting in natural meat products becoming relatively more expensive. Moreover, a reduction in the consumption of natural meat and other animal protein products is generally perceived as more "healthy" and the food processing industry is eager to meet this consumer demand.

Additionally, the incorporation of vegetable protein materials in meat products can lead to an improvement in taste, texture, appearance or other properties of the product.

Regrettably, there is a problem. On the one hand, vegetable protein materials tend to be less expensive than animal products but, on the other hand, in their natural state, they may be unpalatable (e.g. because of pronounced "beany" flavors), socially or personally unacceptable (for example, soya beans contain trisaccharides and tetrasaccharides, whose ingestion can often lead to flatulence), or may be perceived merely as "vegetables", fit only to be consumed by animals or vegetarians. In order to overcome these problems of consumer acceptability, one of the most common practices is to isolate the protein from the vegetable to produce a product containing a relatively high protein content, from which, desirably, the objectionable flavor and physiologically active compounds have been removed and, perhaps somewhat less desirably, the physical structure has also been destroyed. This product will normally be in the form of a powder having, provided it has been processed properly, a fairly neutral flavor and having a color which may vary from white to, in general, light beige. Such a product may be of the type referred to as a "vegetable protein concentrate" or "vegetable protein isolate". This product then has to be processed in some way to give it a flavor and texture acceptable to the consumer. For example, where it is to be used as a meat extender or replacement, it may be necessary to impart a generally "fibrous" texture to the product.

Parenthetically, it should here be noted that the use of terms such as "fibrous" does not, in this technology, imply the presence or absence of fibers as such, but merely refers to the perceived texture, either visual or, and much more important, that texture perceived upon consumption and commonly described by the expression "mouthfeel".

Many processes have been developed for imparting texture ("texturising") vegetable protein materials, including a variety of spinning processes and several extrusion-expansion processes. These often produce excellent products, but can be expensive or may produce products which, whilst having the requisite texture are too obviously "meat replacements" to be acceptable in certain types of products.

We have now discovered how to produce a vegetable protein product (which may be used in association with animal protein products), which possesses a distinctly granular appearance, and which is thus capable of simulating a minced animal protein product.

BRIEF SUMMARY OF INVENTION

Accordingly, in its broadest aspect, the present invention provides a process for producing a functional vegetable product for use with animal protein materials, in which a non-hydrated vegetable proteinaceous extract is blended under conditions of shear with a quantity of water insufficient for full hydration of the extract and with a frozen animal food product, preferably animal protein product, having a temperature sufficiently low to render it essentially rigid, to produce a granular product containing said vegetable proteinaceous extract and said animal food product.

DETAILED DESCRIPTION OF INVENTION

The animal protein product or other animal food product employed in the process of the present invention is a food, preferably protein, product derived from an animal, whether by slaughter or otherwise, and may preferably be, but is not limited to, meat. The term "meat" as used herein includes not only animal tissue (such as would be recognised as "meat" by the layman, particularly skeletal meats, such as pork shoulder, beef shoulder, beef flank and turkey thigh), but also that broader class of animal products recognised as "meat" by the food processing industry, such as meat by-products, pork heads, pork skirt, poultry meal, fish trimmings, fish meal, rendered meal, meat trimmings, animal liver, meat meal, meat and bone meal, mechanically deboned meat, blood and offal. The meat may be derived from any animal, which term, as used herein, includes mammals (both land-based and aquatic), reptiles, fowl, fish, insects, crustaceans, molluscs, and any other such living organism which is capable of being consumed by humans or other animals, whether or not it is actually commonly used as a food source at the present time. It will, of course, be appreciated that the nature of those animals which are regarded as acceptable for human or even pet consumption may vary from time to time and will also, of course, vary with custom, culture and fashion. Typical meat sources which may be employed in the process of the invention are the flesh and by-products of chicken, pork, lamb, sheep, fish, octopus, squid, snake, dog, beef, turkey, horse, duck, venison, guinea fowl, birds other than those specifically mentioned above (including game birds), crabs and lobsters. Apart from meat, other animal protein products include milk and products derived from milk, including skimmed milk, yoghurt and, most notably, cheese. Other non-protein animal food products which may be used in the invention include animal fat.

Of course, mixtures of any two or more of these animal food products may be used in the present invention in order to achieve particular effects or flavor or mouthfeel characteristics. For example, it is often desirable to incorporate fat in the product in addition to at least one type of meat in order to improve succulence and flavor.

Specific examples of animal food products which have been successfully used in the process of the present invention include pork shoulder, beef shoulder, beef flank, turkey thigh, beef liver, ox heart, pigs heart, pork heads, pork skirt, beef mechanically deboned meat, chicken mechanically deboned meat, beef fat and cheese.

The nature of the animal food product will have an influence on the nature and appearance of the final product, and thus this should be chosen with care having regard to the desired characteristics of the final product. Thus, a high fat content leads to a soft product. A high collagen content leads to a hard product (collagen may be provided by, for example, rinds or similar animal products). A high content of salt-soluble myofibular protein leads to a product which, whilst still hard, is not so hard as that with a high collagen content. A high content of salt-insoluble myofibular protein leads to a product of intermediate hardness. Hence, for most purposes, it is desirable to include a balance of these proteins to provide the desired balance of hardness and softness. Also, the taste and appearance of the final product should be taken into account in determining the balance of different proteins as should local food content regulations.

It is a particular advantage of the present invention that it enables the food processor to use animal food, especially protein, products which, perhaps by virtue of an intense color and/or flavor (such as might be the case with certain poultry products, many offal products and congealed blood), are currently unacceptable, accepted only with difficulty or accepted only by a limited population, since the incorporation of the vegetable proteinaceous extract can reduce the intensity of both color and flavor.

It will, of course, be understood that there are many variables in the process of the present invention and that variation of these will lead to different characteristics in the final product, some of which may be less desirable than others. It is well within the skill of the food technologist to make such variations on the basis of the information given hereafter.

Although the details of the preparative process of the present invention will vary depending upon the exact nature of the desired final product, we have surprisingly found that certain features of the process of the invention are highly critical if one is to obtain the desired granular structure and that failure to comply with these requirements will lead to a failure to produce the desired granular meat-like product.

The first critical feature of the process of the invention is that the vegetable proteinaceous extract employed should not be hydrated prior to mixing with the water and the animal food product. Accordingly, it is highly desirable to control the order in which the components are mixed: we prefer that the water and animal food product should be mixed first and that the vegetable proteinaceous extract should be added to the resulting mixture. The degree of hydration also appears to have a significant effect on the nature of the product achieved and too high a hydration level will prevent the formation of granules. The precise level at which granule formation is inhibited will vary depending upon the nature of the vegetable proteinaceous extract and possibly on the animal food product employed with it, but, in general, a hydration level not greater than 3 parts of water for each part of vegetable proteinaceous extract is preferred. However, the level can go somewhat higher (albeit not so high that complete hydration of the vegetable proteinaceous extract takes place) in specific products, e.g. a product designed for incorporation in an English breakfast sausage or for specific purposes, e.g. to improve pumpablity of the product. In such a case, a hydration level up to 5 or 6 (i.e. 5 or 6 parts of water per part of vegetable proteinaceous extract) may be acceptable. More preferably, the hydration level is not greater than 2.5 parts of water per part of vegetable proteinaceous extract, e.g. from 2.5:1 to 2:1, and the most preferred level appears to be about 2 parts of water for each part of vegetable proteinaceous extract, although this will vary with the vegetable proteinaceous extract; the precise optimum level can be found by simple experimentation, keeping all other factors constant, but varying the level of hydration and determining, from simple visual observation, whether or not granulation occurs. The minimum level of hydration appears to be less critical, but, in general, we would not recommend going below a level of one part of water per part of vegetable proteinaceous extract and not less than 1.5 parts of water per part of vegetable proteinaceous extract is preferred. It will be seen from the values given above that the proposed hydration levels are significantly lower than those normally employed in the hydration of vegetable proteinaceous extracts, where a minimum is considered to be 3.5:1, and a level of 4:1 or 5:1 or even higher is more common.

It is also essential that the animal food product should be at a temperature sufficiently low to render it essentially rigid. The exact value of this temperature will vary with the nature of the animal food product. For example, in the case of hard cheeses, such as cheddar or similar cheese, the temperature should be below 10° C., and more preferably below 5° C., e.g. 4° C., since such cheeses become essentially rigid at relatively high temperatures. On the other hand, most meat products are far from rigid at any temperature above 0° C., and, in that case, the temperature should be not greater than 0° C., and preferably significantly below 0° C., at the point when the animal food product is mixed with the hydrated vegetable proteinaceous extract. Thus, 0° C. is the maximum temperature for the animal food product in the process of the present invention, when that product is a meat, and, in practice, the maximum temperature for meat is $-1°$ C.; more preferably for meat we would use a temperature not exceeding $-6°$ C. The minimum temperature is determined primarily by operational factors, rather than by any requirements of the present invention. Thus, it is impractical to have too low a temperature, as the mixers available in the food industry will simply not work. In general, we do not recommend a temperature significantly below $-30°$ C., with, say, $-40°$ C. as the practical minimum; in most cases, the actual operating temperature is likely to be above this minimum. Most industrial freezers operate at a nominal temperature of either $-20°$ C. or $-40°$ C., and the actual temperature of the animal food product at the time of adding to the other ingredients will be determined by this. Normally, depending on the nature of the apparatus used, it will be desirable to reduce the size of the animal food product prior to incorporation. This may be achieved by various means, but the effect will normally be to raise the temperature of the animal food product; thus, food coming from the freezer at $-40°$ C. will normally be added at $-30°$ C., whilst food coming from the freezer at $-20°$ C. will normally be added at about $-13°$ C. A preferred temperature of the animal food product, where that product is a meat, at the time it is mixed with the other components is in the range from $-3°$ C. to $-20°$ C., more preferably from $-10°$ C. to $-20°$ C., although, provided that the product is frozen, the precise temperature, at least within the limits achieved by ordinary commercial food freezers, does not appear to be too critical. In the case of a hard cheese, the preferred temperature is in the range of from $5°$ to $-20°$ C.

The water added to the ingredients to hydrate partially the vegetable protein will normally be at or about ambient temperature, and, although there is no reason why the water should not be at any other temperature within its normal range of liquidity (provided, if it is hot, that compensating reductions are made in the temperature of other components), no advantages are seen to employing a temperature other than its normal temperature as supplied, e.g. from $1°$ C. to $18°$ C., more commonly from $5°$ C. to $10°$ C. Water which is too hot will raise the temperature of the whole mixture and may lead to hygiene problems; accordingly, water towards the cooler end of the suggested range is preferred.

Another factor which has an influence on the texture of the granular product of the invention is the ratio of vegetable proteinaceous extract to animal food product. The ratio of vegetable proteinaceous extract to animal food product may vary quite widely, whilst still producing the desired granular effect, but the precise ratio will have an influence on other characteristics of the product and it will be desirable to vary this ratio in order to achieve a product having the optimum characteristics for the intended final use. Furthermore, the nature of the animal food product influences the particular ratios at which properties of the final product are exhibited. For example, the optimum ratio of vegetable proteinaceous extract (prior to hydration) to animal food product is 1:2 by weight when the animal food product is a good quality meat containing sufficient residual structure, such as might be exemplified by beef flank or ox heart. However, at such a ratio, mechanically deboned meat (whose manner of preparation has normally resulted in almost total loss of structure) gives a rather soft and sticky granule, which is less desirable and has less tendency to retain the granular appearance and mouthfeel in the final product. This softness and stickiness can be reduced by increasing the proportion of mechanically deboned meat, and a ratio of about 1:3 by weight has been found to be the optimum for this type of product, if mechanically deboned meat is to be the sole or primary source of meat. For both types of product, the proportion of water also has an influence and must be taken into account. However, it is a matter of simple experimentation to vary mixing ratios until a product having the particular desired characteristics is achieved. In general, we prefer that the ratio of vegetable proteinaceous extract (prior to hydration) to animal food product should be within the range from 1:1 to 1:6, more preferably from 1:1.5 to 1:4, still more preferably from 1:1.8 to 1:3.2, by weight, and most preferably from 1:2 to 1:2.5.

The nature of the vegetable proteinaceous extract used in the process of the invention is less critical, except to the extent that the product is preferably sufficiently processed as to reduce to a minimum undesirable flavor, color and physiologically active components. In general isolates of the high viscosity type are preferred. Such products are, however, well known in the art and readily available commercially, for example from such companies as Protein Technologies International (UK) Limited in Great Britain or Protein Technologies International and Ralston Purina Company in the USA.

The choice of which vegetable to use to produce the proteinaceous extract is not a matter critical to the invention and ultimately the choice should be dictated by price and availability, which, in turn, are influenced by such factors as climatic conditions, agricultural fashions and sometimes political considerations. It is thought that the nature of the vegetable from which the vegetable proteinaceous extract is extracted is not critical to the process of the present invention. At present, the most widely available vegetable protein isolates with a consistent availability and reliable high quality and purity are isolates formed from soya beans and, for this reason, the invention is hereafter exemplified with reference to the use of soy proteinaceous extracts. However, this may change with time or vary from country to country. In general, we most prefer to use protein materials derived from oilseeds, particularly those derived from sesame seeds, cottonseeds, peanuts or rapeseeds, as well, of course, as soya beans. The proteinaceous extract will normally have a relatively high protein content, i.e. higher than the protein content of the native vegetable from which the extract was produced. Too low a protein content leads to the prior art doughy sausagemeat type of product. In general, a protein concentration of at least 65% by weight (dry solids basis) is preferred, a concentration of at least 70% being more preferred and a concentration of at least 80% being most preferred. At the lower levels of protein content, the product should preferably be a highly functional (i.e. high quality grade of) proteinaceous extract. Products having a protein content of about 70% by weight are commonly called in the industry "vegetable protein concentrates". At the higher levels of protein concentration, the product is commonly referred to as a "protein isolate", protein isolates normally having a protein content of about 90%. For purposes of the present specification, the expression "proteinaceous extract" is used to refer to all such products, including those sub-classes known as "isolates" and "concentrates". Examples of suitable soy proteinaceous extracts which may be employed in the present invention include those designated as PP500E and PP515 and available from Protein Technologies International (UK) Limited.

The granules, the product of the present invention, may if desired, be used as they are as a food product, since they can, as explained hereafter in more detail, be produced in a nutritionally balanced form and may, if desired, contain appropriate coloring and/or flavoring matter to make them acceptable, in themselves, to the consumer. However, we have found that the granules are most acceptable when used as an extender of other animal products, particularly animal protein products, such as meat. To this end, the granules may be mixed with an appropriate proportion of the other animal product, so as to provide the desired final end product. There is, of course, no restriction on the proportion of the granules to be incorporated and, in principle, the ratio could range from an overwhelming predominance of the granules of the invention (say, a ratio of granules to other animal protein product of 99:1 by weight) to an overwhelming predominance of other animal protein products (say, 1:99 by weight). In practice, however, there would be little point in the blend if the amounts were to be so disproportionate, and, accordingly, a proportion of granules to other animal food, especially protein, product of from 10:90 to 50:50 by weight is preferred, more preferably from 20:80 to 40:60 and most preferably about 30:70 by weight, especially for minced meat-type products and burgers.

In order to achieve the granular structure of the present invention, it is not only necessary that the vegetable proteinaceous extract employed in the present invention should be relatively under-hydrated, but it is also necessary that it should not be hydrated prior to mixing with the frozen animal food product. Specifically, if the vegetable proteinaceous extract is hydrated prior to mixing with the frozen animal food product or if the vegetable proteinaceous extract is hydrated to the level conventional in the prior art, the product, rather than resembling the granules of the present invention, will resemble the sausage meat paste common in the prior art. The best way of adding the non-hydrated vegetable proteinaceous extract is to place the frozen animal food product and water in an appropriate mixer and, if desired, give those two components a preliminary mix, after which the non-hydrated vegetable proteinaceous extract is added and all three components are then mixed together. If desired, the mixing at this stage can, in accordance with the present invention, be accompanied by shear forces, such as would be achieved by means of a standard commercial bowl cutter. Alternatively, the mixture at this stage may be subjected to simple mixing and then subsequently subjected to mixing with shear by passing it through a mincing machine. Mixing of the ingredients need only be continued for sufficient time to produce the desired granular structure, which can easily be determined by visual observation. Excessive mixing is undesirable, both from the point of view of waste of energy and also because it could break down the granular structure. Generally, mixing with shear need be carried out for no more than about 1 minute, and generally substantially less, e.g. less than 40 seconds, more preferably less than 30 seconds and commonly about 20 seconds. However, the precise mixing time required will depend upon the nature, proportions and temperature of the ingredients and the manner in which shear is applied, and can easily be determined for any particular blend by simple experiment.

As has previously been observed, the normal color of properly processed vegetable proteinaceous extracts will be very light, e.g. from white to beige. The effect of incorporating such a light product into an animal food product, many of which are highly colored, is to reduce the perceived level of color of the final product. In many cases, this may be desirable. For example, such animal meat products as blood, liver or kidneys generally have a very highly pronounced color and, if incorporated by themselves into a finished product, might render that product too highly colored to be acceptable to most European or American consumers. Another example is certain parts of poultry meat, for example turkey or chicken thigh meat, which is naturally more highly colored than, for example, breast meat and is falsely perceived by the consumer to be a less desirable product. In such cases, therefore, the reduction in color achieved by incorporating the vegetable proteinaceous extract constitutes an advantage. If the granules of the present invention are intended to extend a naturally light-colored meat, for example, chicken breast meat, turkey breast meat or certain cuts of pork, then the lightness of the vegetable proteinaceous extract will be neither an advantage nor a disadvantage. However, for other types of meat, e.g. beef, venison or much game, the consumer expects a certain level of coloration and, should the final product fail to achieve this color level, the consumer may be reluctant to consume it. In such a case, it is desirable to incorporate a food color or blend of food colors, as is well known in this industry. Examples of food colors which may be incorporated include caramel, tartrazine (FD&C Yellow No. 5), erythrosine (FD&C Red No. 3), Red 2G, carmine and carmoisine.

Of these, a particularly suitable color is provided by caramel. The amount of color incorporated will vary very widely, depending upon the color of the principal ingredients, the desired color of the final product and the nature of the color itself; accordingly, no general guidance can be given. However, this matter is well understood by those skilled in the art.

Likewise, it may or may not be desirable to incorporate a flavoring additive into the granules of the invention. In general, we prefer that such flavoring additives should not be included, since it is more economical to produce a general purpose granule which can be used for several applications and to which flavoring can (if required) be added at the point when it is incorporated into the final product. However, should a flavoring be required, this may be any of the commercially available meat flavorings, often hydrolysed vegetable proteins, for example Protex 301, Protex 300, SSF 101 (a product of Food Ingredients Supplies Ltd.). Advit Strong Beef (Quest), Advit Pork (Quest) and Quest Steak Flavour.

As with the colors, no general guidance can be given with regard to the amount of flavor to be incorporated, since this is very much a matter of taste as well as being dependent upon the flavoring of the principal ingredients and the desired flavor of the final product.

If colors and/or flavors are to be added, these are preferably added to the mixture at about the same time as the water, and may, if required and if they are water-soluble, be dissolved in the water prior to addition to the mixture.

The granules of the present invention, preferably after mixing with another animal protein product (as described earlier), may be incorporated into a variety of different foodstuffs. Obviously, the intended nature of the final product dictates the components of the granules of the invention which are to be used. For example, granules in which the animal food product is provided by cheese or a cheese-flavored dairy-based mixture can be mixed with meat to provide a "cheeseburger" formulation. Meat-based granules can be mixed with more meat to form the ingredients of pies, sausages, pizza toppings, burgers and patties of various types, as well as stews and the like. The use of the granules provided by the present invention in sausages, which may be of the emulsified type (e.g. the English breakfast sausage) or the hard and meaty type, is particularly valuable, enabling variations in the ingredients and manufacturing process, e.g. to form a reduced fat sausage, without substantial variations in the character of the sausage. The granules may also be treated simply as an additional meat ingredient and incorporated into the formulation in place of some of the meat which would otherwise be used. The granules retain their structure during the cooking to which food products are normally subjected and, if incorporated into final products containing significant quantities of water, for example meat-in-sauce recipes, such as stews or certain types of pie, actually expand slightly by absorbing some of the water, whilst still retaining their structural integrity.

The invention is further illustrated by the following Examples.

EXAMPLE 1

Figure 1:
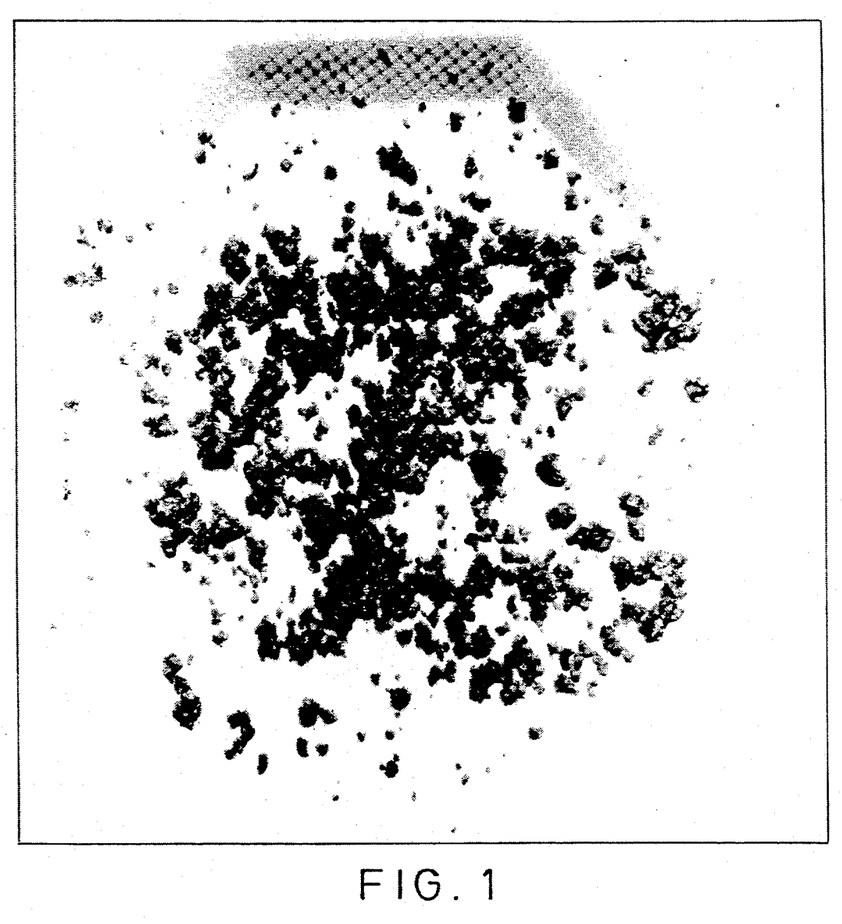
FIG. 1 shows a granular product made in accordance with the present invention based on ox heart, as in Example 1.

Frozen ox hearts, taken from a freezer maintained at −20° C., were broken up by means of a band saw to form smaller pieces, approximately cubical, of dimensions about 1–3 cm. The precise size is unimportant and the breaking up is merely to facilitate subsequent processing. In the course of this, the temperature of the ox hearts rose to about −13° C. Two kg of the broken ox hearts were placed into a bowl cutter (Kilia), and 2.0 kg of cold tap water were added straight from the tap with no heating or cooling. The mixture was then chopped at high speed (with the knives rotating at about 3,600 rpm). After about 30 seconds, the mixture had formed a puree and the knives were switched to the lower speed (about 200 rpm). At this point, 1.0 kg of a soy protein isolate (PP500E, obtainable from Protein Technologies International) were added and chopping was continued at the slow speed until granules formed, which took about 20 seconds. The product is shown in FIG. 1 of the accompanying drawings.

EXAMPLE 2

The procedure described in Example 1 was repeated, except that the mixture of water, ox hearts and protein isolate was mixed without shear in an ordinary commercial mixer. The mixture was then transferred to a mincer, where it was mechanically minced, and simultaneously subjected to shear forces, and then passed through a 3–4 mm diameter plate. The product was very similar to that of Example 1, but a little firmer in texture.

EXAMPLES 3-7

The procedure described in Example 1 was repeated except that the ingredients employed were as shown in the following Table 1.

In carrying out the procedure of Example 3, PP 515 was used in place of PP500E. The beef fat, rinds (i.e. pork skins) and beef flank were employed in place of or in addition to the ox heart and were treated exactly as was the ox heart in Example 1.

The product of Example 3 was essentially identical with that of Example 1. The product of Example 4 was very similar to that of Example 1 but was more moist and succulent. The product of Example 5 gave too moist an appearance, indicating that, if beef fat is to be used. a somewhat lower level of the fat and/or the water should be employed. The product of Example 6 had a good flavor and appearance but was slightly dry. The product of Example 7 was firmer than that of Example 1 but otherwise essentially the same as that of Example 1, indicating that the incorporation of rinds made no substantial difference. However, it does demonstrate that the incorporation of materials containing collagen does increase the firmness of the product. In all cases, the product had a good granular structure. The amounts given in Table 1 are shown in kilograms.

TABLE 1

| Ingredient | Example No. | | | | |
|---|---|---|---|---|---|
| | 3 | 4 | 5 | 6 | 7 |
| PP500E | — | 1.0 | 1.0 | 1.0 | 1.0 |
| PP515 | 1.0 | — | — | — | — |
| Water | 2.0 | 2.0 | 2.0 | 2.0 | 2.0 |
| Ox Heart | 2.0 | 1.0 | — | — | 2.0 |
| Beef fat | — | 1.0 | 2.0 | — | — |
| Ox lips | — | — | — | — | — |
| Rind | — | — | — | — | 0.5 |
| Beef flank | — | — | — | 2.0 | — |

EXAMPLES 8-13

The procedure described in Example 1 was repeated, except that the ingredients shown in Table 2 (amounts in kilograms) were employed. The beef fat was treated in the same way as the ox hearts of Example 1. HVF 50, Protex and Adbeef (reg'd trademarks) are proprietary flavoring materials and were added at the same time as the water. The caramel is a coloring material and was added dissolved in the water. In all cases, good discrete granules were produced having a meaty appearance and flavor.

TABLE 2

| Ingredient | Example No. | | | | | |
|---|---|---|---|---|---|---|
| | 8 | 9 | 10 | 11 | 12 | 13 |
| Ox heart | 1.0 | 1.0 | 1.0 | 1.0 | 1.0 | 1.0 |
| Water | 1.0 | 1.0 | 1.0 | 1.0 | 1.0 | 1.0 |
| PP500E | 0.4 | 0.5 | 0.5 | 0.5 | 0.5 | 0.5 |
| HVF 50 | 0.1 | — | — | — | — | — |
| Protex | — | 0.05 | 0.1 | — | — | — |
| Adbeef | — | — | — | 0.05 | 0.1 | — |
| Caramel | — | — | — | — | — | 0.02 |
| Beef fat | — | — | — | — | — | 0.5 |

EXAMPLE 14

1.0 kg of cheddar cheese offcuts were removed from a commercial freezer at about −20° C. and broken up. They were then placed at a temperature of about −14° C. into the same bowl cutter as was used in Example 1. One kg of cold tap water was then added and the mixture was chopped at high speed (the knives moving at about 3,600 rpm). The mixture very quickly formed a puree, whereupon the chopper was switched to a low speed (about 200 rpm) and 0.5 kg of soy protein isolate PP500E was added. Chopping was continued at the slower speed until granules formed, which took about 20 seconds. These meat-free granules had a good cheesy flavor and a firm texture.

Beef flank (1.6 kg) was ground through a double kidney plate and mixed with 0.4 kg of cheese granules produced as described above, 0.16 kg of salt and 0.004 kg of ground white pepper. The ingredients were mixed and formed into burgers. After frying, the burgers were found to have a good cheesy flavor and appearance, together with an excellent coarse meaty texture.

Burgers were produced in a similar way to that described above, except that the ingredients were 1.0 kg of cheesy granules, 0.008 kg of salt and 0.002 kg of ground white pepper. These likewise had a good cheesy flavor and a coarse meaty texture.

The following comparative Examples illustrate the dependence of the process of the invention on various parameters.

COMPARATIVE EXAMPLE 1

1.0 kg of vegetable protein isolate PP500E was mixed and allowed to hydrate with 2 kg of water. Frozen ox heart was then treated as described in Example 1 and the hydrated vegetable protein was added to the broken ox hearts in a bowl cutter and mixed as described in Example 1. The product obtained was an essentially homogenous sausage meat-like product.

COMPARATIVE EXAMPLE 2

The procedure described in Example 1 was repeated, except that the amount of water was increased to 4.5 kg (the standard amount for hydrating a vegetable protein isolate of this type). The product obtained was an essentially homogenous sausage meat-like puree without any granular structure.

COMPARATIVE EXAMPLE 3

The procedure described in Example 1 was repeated, except that the frozen ox hearts were allowed to reach essentially ambient temperature before being placed in the bowl cutter. As with the other Comparative Examples, the product obtained was an essentially homogenous sausage meat-like puree, with no trace of granular structure.

The following Example demonstrates the stability of the granules of the invention under conditions of use.

EXAMPLE 15

Each of the products of Examples 1-13 (the "granules") and Comparative Examples 1-3 (the "puree") was treated as follows.

Chuck steak was coarsely minced and 1.4 kg mixed with 0.6 kg of granules of puree and the whole reminced. The granules tended to adhere to the "real" meat and did not disintegrate. The puree products of Comparative Examples 1-3 simply passed through the mincer without any change, although generally adhering to the coarsely minced meat. Each product was then separately placed into water and heated until completely cooked, to produce a product resembling stew. In the case of the products of Examples 1-13, these all retained their structural integrity and generally slightly expanded as a result of the absorption of water. The products of Comparative Examples 1-3 all disintegrated into a mush which, during cooking, dispersed through the water, forming a thickened sauce in which the meat appeared as discrete particles.

EXAMPLE 16

Figure 2:
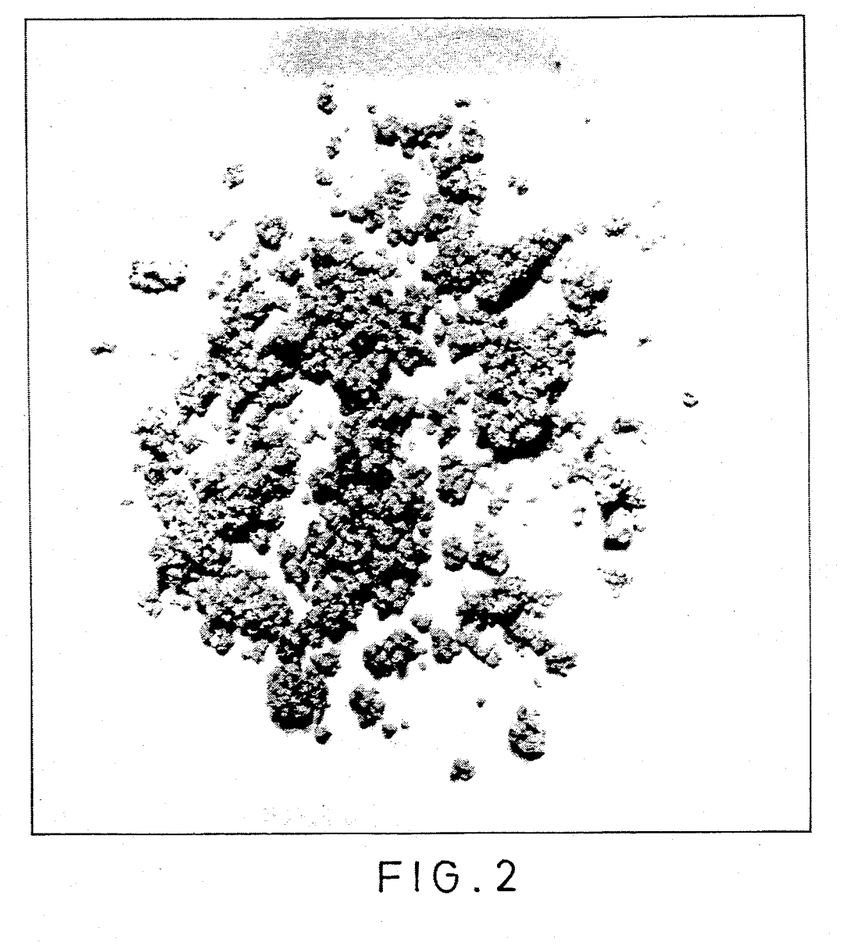
FIG. 2 shows a granular product made in accordance with the present invention based on chicken mechanically deboned meat, as in Example 16.

The process described in Example 1 was repeated, except that the ox hearts were replaced by chicken mechanically deboned meat. The product had the appearance shown in FIG. 2 of the accompanying drawings, which clearly shows the granular appearance of the product.

Figure 3:
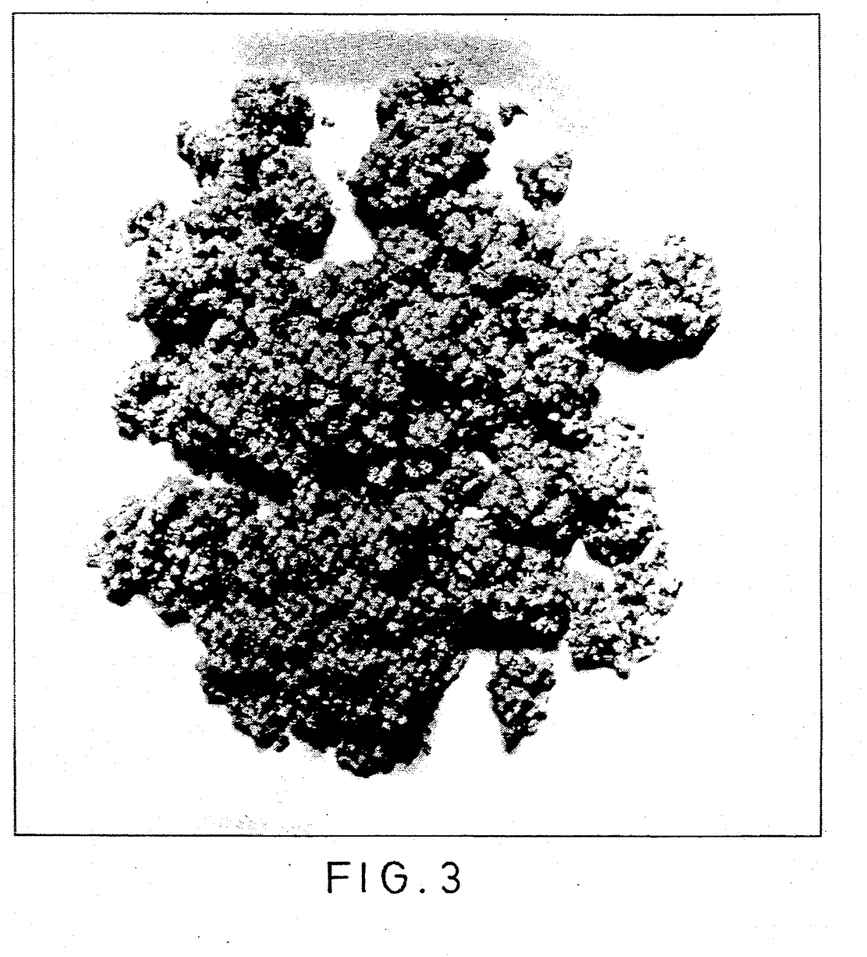
FIG. 3 shows a granular product made in accordance with the present invention based on chicken mechanically deboned meat similar to that of FIG. 2, but in which the proportion of water has been increased.

This procedure was then repeated, except that the amount of water was increased by approximately 1 kg. The product, which is shown in FIG. 3, had a somewhat looser texture but was still clearly granular and the looser texture is an advantage in certain types of product and where the mixture needs to be pumped.

Figure 4:
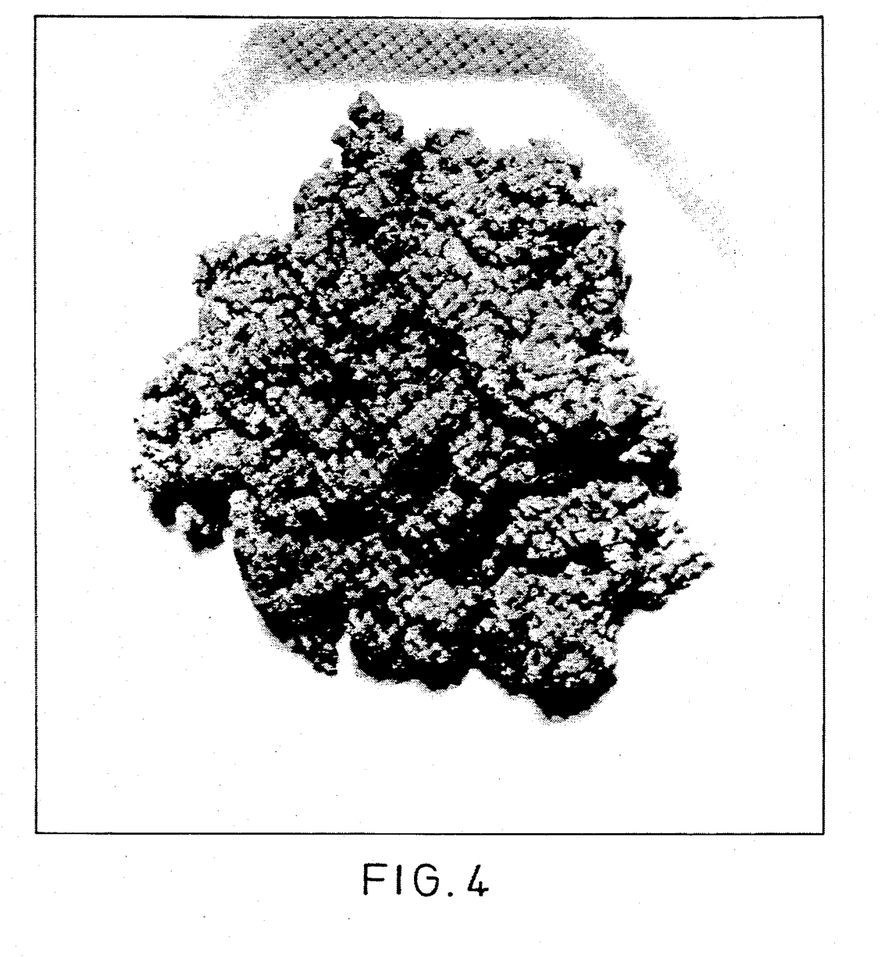
FIG. 4 shows a granular product made in accordance with the present invention based on chicken mechanically deboned meat similar to that of FIG. 3, but in which the proportion of water has been still further increased and which is on the borders of acceptability.

The procedure was then again repeated, except that the amount of water was increased by approximately a further 1 kg. The product, which is shown in FIG. 4, had a still looser texture but still showed some granular characteristics. The product is on the borders of acceptability.

Figure 5:
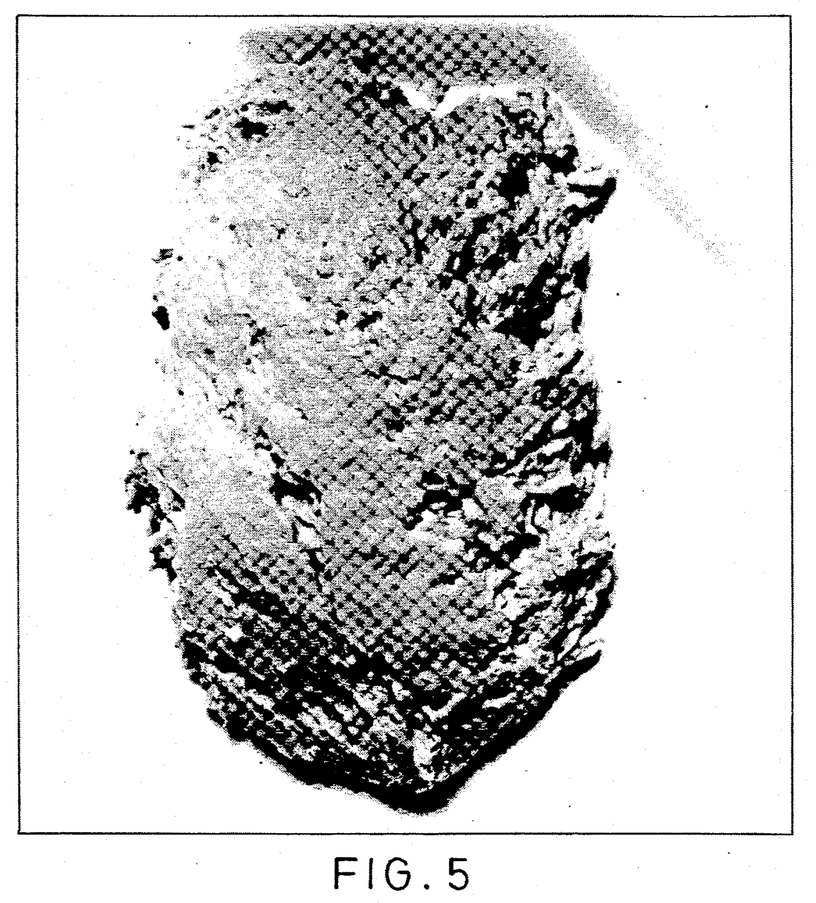
FIG. 5 shows a granular product made in accordance with the present invention based on chicken mechanically deboned meat similar to that of FIG. 4, but in which the proportion of water has been still further increased and which has wholly lost its granular appearance.

The procedure was then yet again repeated, except that the amount of water was increased by approximately a further 1 kg. The product, which is shown in FIG. 5, had lost any granular appearance and was simply a dough-like pasty product which lacks all of the advantages of the present invention.

EXAMPLE 17

The process described in Example 1 was repeated, except that the following ingredients were used; water, 6.00 kg; pork belly, 6.00 kg; protein isolate PP500E, 3.00 kg, to prepare a granular product.

This was then mixed with the following ingredients in a conventional sausage meat process: water 10.30 kg; pork shoulder, 39 kg; pork backfat, 8.50 kg; shin, 5.00 kg; rusk, 8.00 kg; seasoning, 2.10 kg; rind emulsion. 12.10 kg. The product was filled into sausage skins to form sausages of the English breakfast type. On frying, these proved meaty and highly palatable.

EXAMPLE 18

The procedure of Example 17 was repeated, except that the granular product was prepared from 7.73% by weight water, 7.73% by weight pork backfat and 3.87% by weight PP500E. This product was then mixed with 22.85% water, 43.93% pork meat products (pork lean trims, lean pork, pork headmeat and drinde), 10.54% rusk and 3.35% conventional additives and then formed by conventional means into a low fat sausage having an excellent texture and a good meaty flavor and mouthfeel.

We claim:

1. A process for producing a granular protein product comprising: blending about one part by weight of a vegetable protein material selected from the group consisting of vegetable protein concentrates and vegetable protein isolates with about 1 to 3 parts by weight of water and about 1 to 6 parts by weight of a frozen animal protein product under conditions of shear to produce a granular protein product.

2. A process as set forth in claim 1 wherein the amount of water is about 1.5 to 2.5 parts by weight.

3. A process as set forth in claim 1 wherein the amount of water is about two parts by weight.

4. A process as set forth in claim 1 wherein the animal protein product is at a temperature not greater than about 0° C.

5. A process is set forth in claim 4 wherein the animal protein product is at a temperature of about −3° to −20° C.

6. A process as set forth in claim 5 wherein the animal protein product is at a temperature of about −10° to −20° C.

7. A process as set forth in claim 1 wherein the amount of animal protein product is about 1.5 to 4 parts by weight.

8. A process as set forth in claim 7 wherein the amount of animal protein product is about 1.8 to 3.2 parts by weight.

* * * * *